July 22, 1924.
J. P. NICHOLSON
APPARATUS FOR CLEANING MOTOR VEHICLES
Filed Oct. 14, 1922
1,502,115
2 Sheets-Sheet 1
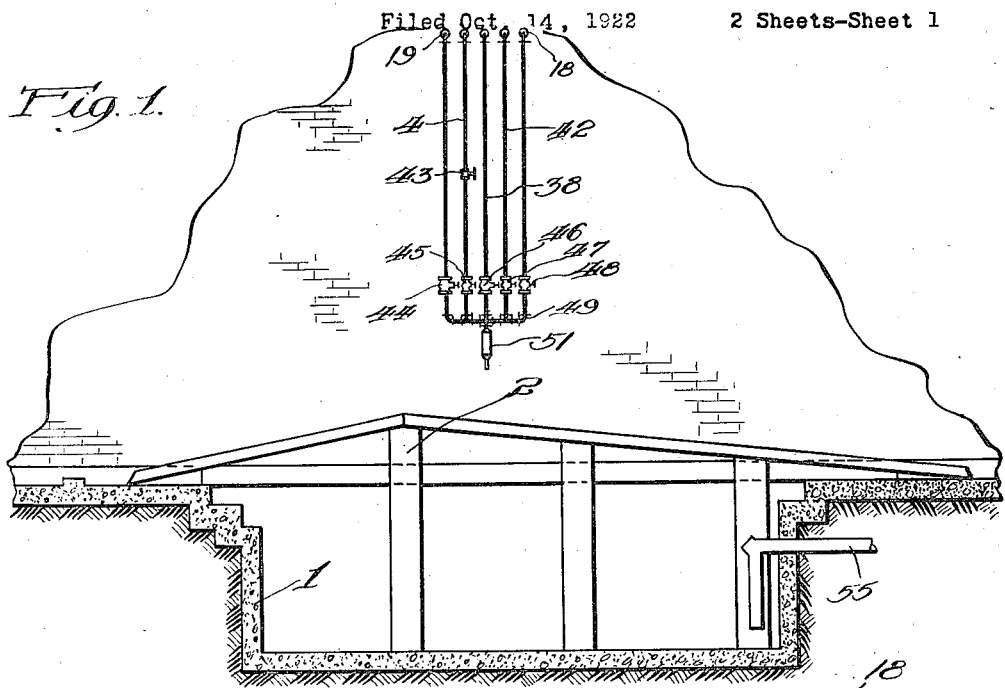
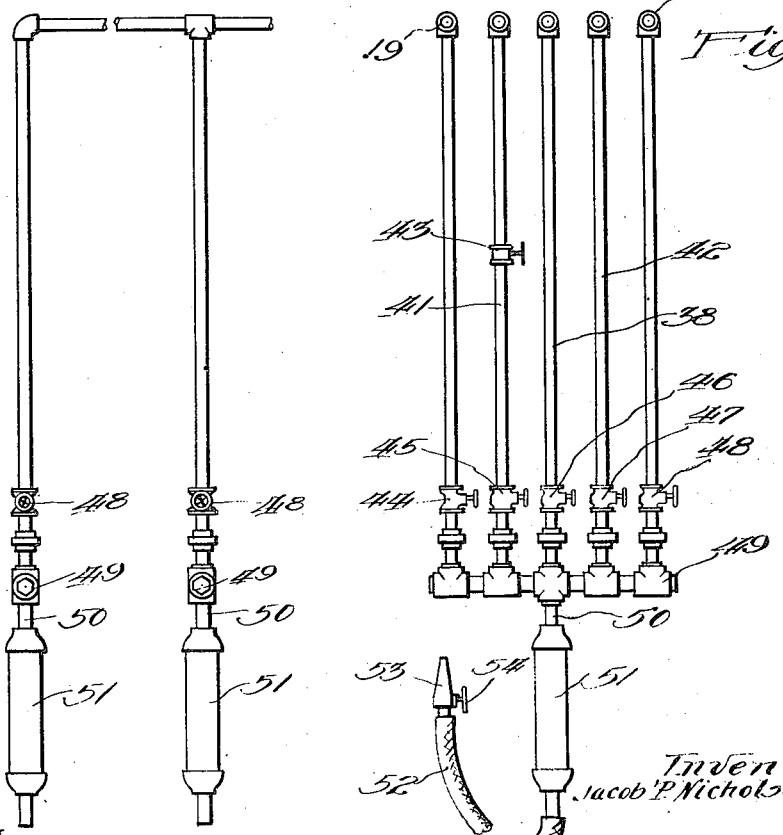
Inventor:
Jacob P. Nicholson,

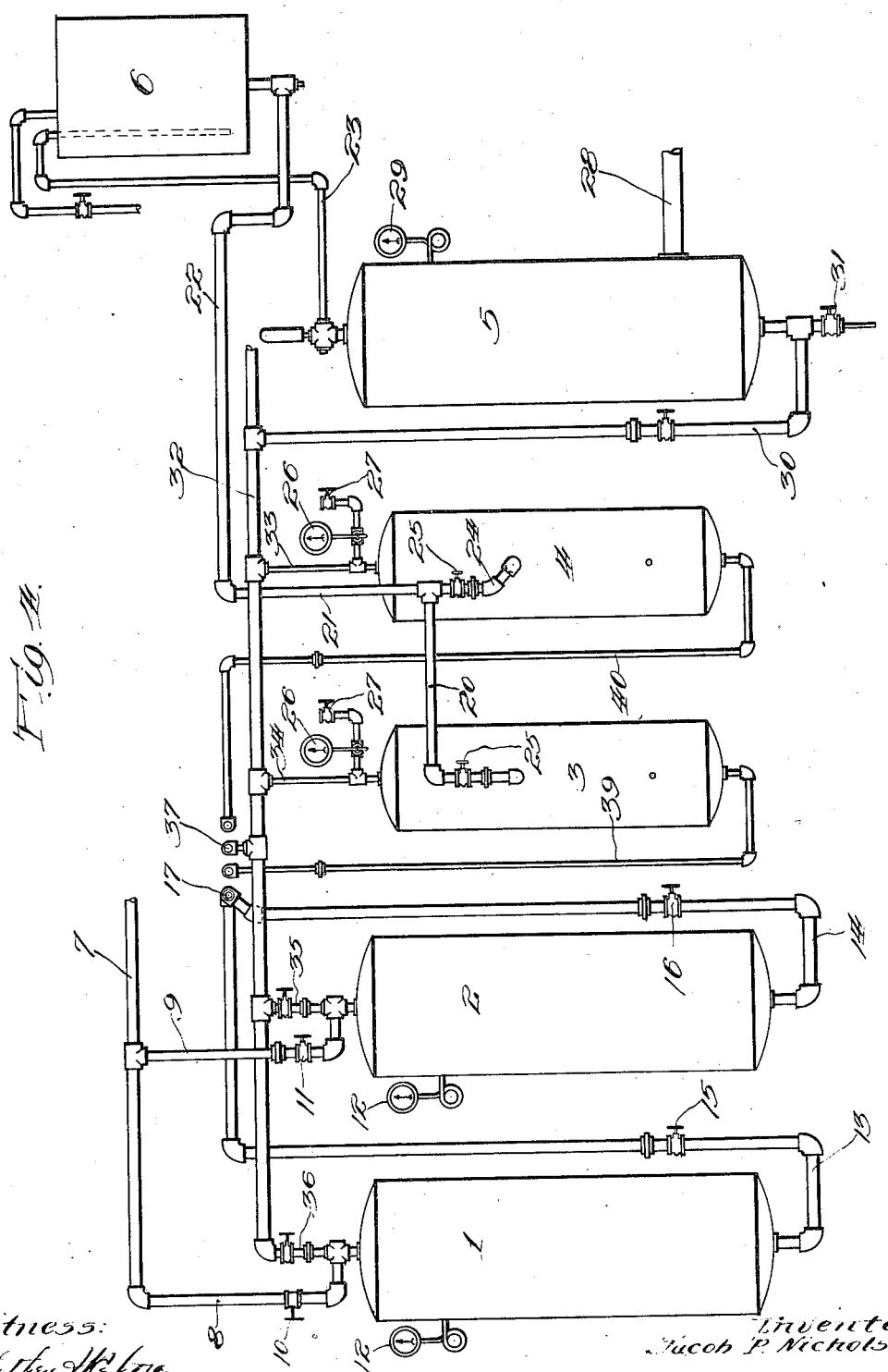

Patented July 22, 1924.

1,502,115

UNITED STATES PATENT OFFICE.

JACOB P. NICHOLSON, OF CHICAGO, ILLINOIS, ASSIGNOR TO KLEAN RITE AUTO LAUNDRY, OF CHICAGO, ILLINOIS, A CORPORATION OF ILLINOIS.

APPARATUS FOR CLEANING MOTOR VEHICLES.

Application filed October 14, 1922. Serial No. 594,662.

*To all whom it may concern:*

Be it known that I, JACOB P. NICHOLSON, a citizen of the United States, residing in the city of Chicago, county of Cook, and State of Illinois, have invented certain new and useful Improvements in an Apparatus for Cleaning Motor Vehicles, of which the following is a specification.

This invention relates to an apparatus for cleaning motor vehicles and refers more particularly to a cleaning apparatus by which water is sprayed in a finely divided condition in combination with a grease solvent and subsequently a soap solution under pressure to remove dirt and grease which collects upon the automobile body and running gear of automobiles, trucks and vehicles of a like character.

Among the objects of the invention are to provide an apparatus by which the accumulation of dust, dirt and grease is first subjected to the effect of a grease solvent which tends to loosen the grease and dirt from the body and running gear, the grease solvent being applied to the vehicle in the form of a vaporous spray which penetrates and frees the dust and dirt particles from the vehicle; to provide apparatus by which after being subjected to the loosening effect of the grease solvent, the grease and dirt accumulations are removed by a similar treatment with a soap solution and water, and subsequently dried with air; to provide a cleaning apparatus which is particularly effective in the dissolving of the oil and grease, and an apparatus for spraying the water and grease solvent and soap solution compound in combination at high pressures, and in the form of vaporous spray upon the body of the vehicle to be cleaned.

Fig. 1 is a view of the mixing apparatus hung upon a wall, with a pit used in connection with the cleaning operation, shown in section.

Fig. 2 is an enlarged view of the mixing apparatus.

Fig. 3 is an end view of the device shown in Fig. 2. Two mixing apparatuses, identical to that shown in Fig. 2 are installed on walls at each side of the car so that two operators can work simultaneously upon the vehicle from the separate mixing stations.

Fig. 4 is a view of the tanks and connections used in supplying the water, soap solution, and grease solvent to the mixer.

Referring to the drawings, the underbody of the vehicle is first sprayed by means of perforated pipes, not shown, laid along the floor of the garage, and adapted to spray water or a combination of water and the grease solvent, loosening the dirt and grease from the underbody of the machine and the running gear.

The vehicle is then run over the pit 1, where it is supported by means of a cradle 2. This position permits the underbody of the machine to be sprayed and freed from the greasy dirt and dust which has been loosened by the underbody spray.

Referring now to the manner in which cleaning liquids are supplied to the header, in some convenient position nearby, are situated the tanks 1, 2, 3, 4 and 5 and the mixing tank 6. Connected to the tanks 1 and 2 which are water tanks, is a feed pipe 7 which has the secondary connection 8 to the tank 1 and a connection 9 to the tank 2. Valves 10 and 11 are interposed in the respective pipes so that one tank may be used in the system while the other is being filled with water, thus the system may be used continuously over a considerable period of time. Tanks 1 and 2 are equipped with pressure gauges 12. In the bottom of the tanks 1 and 2 are tapped the pipes 13 and 14 controlled by the valves 15 and 16. These pipes terminate in a common connection 17 which leads to the washing station or mixer where a connection is made to the pipes 18 and 19.

If desired, the water to either one of the pipes 18 or 19 may be heated in a coil, not shown, prior to its being combined with either the grease solvent or soap solution at the mixing station.

It has been found however, that the cold water is practically as effective, due to the high pressure and finely divided condition of the water as it is ejected from the mixing nozzle.

The tank 3 contains a grease solvent which consists of the following ingredients: 30% sodium bicarbonate, 30% sodium phosphate, 10% borax, 5% salts of tartar, 25% soda, which have been found to be especially effective in dissolving the oil and grease which give the most trouble in removing dirt and dust from the body and running gear of vehicles. This also eliminates the necessity of using an expensive solvent such as kerosene or other hydrocarbon solvents. The tank 3 is connected by the pipes 20, 21 and 22 to the mixing tank 6 where the ingredients are first mixed prior to their introduction to the tank 3. The mixing is effected by means of air agitation supplied through the pipe 23 from the tank 5. In the same manner the soap solution is mixed in the mixing tank 6 by the agitation with air, and is conducted through the pipe 22 and secondary connection 24 to the tank 4. Valves 25 serve to control the flow of the different products to the separate tanks. The soap solution may consist of any common liquid or soft soap used on the market in connection with cleaning of this type, and to increase its efficiency as a grease solvent, a small percentage of the grease solvent explained, is mixed with the soap and incorporated into the liquid cleanser contained in the tank 4 prior to its use on the mixing or washing station.

Pressure gauges 26 are connected to the tanks 3 and 4 with relief valves 27 for relieving if necessary, any excessive pressure. The tank 5 functions as a compressed air tank, the air being supplied through the line 28 from any convenient pump or compressor, not shown. Pressures in excess of 50 pounds, and preferably as high as 80 or 85 pounds are maintained in the tank and indicated by means of the pressure gauge 29.

Into the top of the tank is connected the air connection 23 for agitation of the liquids in the mixing tank. Into the bottom of the tank is tapped a pipe 30, which is equipped with a drip cock 31. The line 30 is connected with a header 32 which has separate connections 33, 34, 35 and 36 with the separate tanks 4, 3, 2 and 1 respectively. Valves are interposed in the lines 35 and 36 to control the air pressure upon the alternate water tanks when one is to be cut out for refilling.

A separate air connection 37 is connected with the pipe 38 on the washing station and furnishes air pressure to effect the mixing of the water and grease solvent, or water and soap solution as it is supplied to the nozzle. The tanks 3 and 4 containing the grease solvent and soap solution are connected by means of the lines 39 and 40 to the pipes 41 and 42 on the washing station.

In the pipe 41 is interposed a valve 43 which is permanently set at a predetermined opening to limit the supply of grease solvent to a regulated amount, thus the amount of grease solvent used, is carefully controlled and is not regulated by an unskilled worker who may be manipulating the apparatus.

The pipes 19, 41, 38, 42 and 18 are controlled by valves 44, 45, 46, 47 and 48 respectively. These pipes are combined in the form of a common header 49 which has connected thereto a line 50 communicating with an enlarged mixing chamber or turbulator 51 wherein the air, water and grease solvent, or air, water and soap solution are combined separately under high pressure and ejected through the hose 52 to which is connected a nozzle 53, in a vaporous spray, which on ejection has the appearance of steam or water vapor.

Heretofore, it has been common practice to play a stream of water under a substantial pressure upon the body of the car in cleaning, and numerous solvents and soap solutions have been mixed with the water to facilitate the removal of dust and dirt from the vehicle.

The force of the water from the nozzle of this character, often has the effect of dulling the gloss or finish of the body and oftentimes checking or removing portions of the finish. Also, the cleaning liquid such as soap solution or grease solution used, have not been satisfactorily mixed or incorporated into the water spray so that there is a uniform cleaning liquid ejected from the nozzle during the cleaning operation, but instead the water and cleansing solution would flow intermittently from the hose or nozzle thereby reducing the effect of the cleansing liquid and producing excessive waste.

By the apparatus here disclosed, a finely dispersed vaporous spray is ejected in a manner which may be played directly upon the most highly glossed finish without any injurious effects.

The water and soap solution or grease solvent are thoroughly intermixed so that the spray has at all times a uniform constant proportion of cleansing liquid in the form of a grease solvent or soap solution thoroughly incorporated therein.

The water, grease solvent and air are first introduced through their respective lines into the header and thence into the mixing chamber or turbulator 51 where their proportions are carefully controlled by manipulation of the valves 44, 45 and 46. This combination is first sprayed upon the body of the car, and serves to loosen the greasy dirt and dust which is the most difficult to remove. The car is then subjected to a spray which is made up of a combination of air, water and soap solution supplied through the valves 46, 47 and 48, or 46, 47 and 44. The water pipes may be used alternately, hot water being used in one pipe and cold water in another. Normally, except in the case of vehicles encrusted with heavy layers of dirt and grease, it is unnecessary to use anything but the cold water.

The hot water pipe is supplied to facilitate the removal of dirt in the more difficult jobs. The dirty water from the car flows down into the pit 1 where it is drawn off through the pipe 55.

It will be readily appreciated that a motor vehicle can be cleaned in a very short period of time, and in a very effective manner with this type of apparatus. The grease solvent is cheaper than using a hydrocarbon product such as kerosene or any other light distillates, and is as effective.

In Fig. 3 a view is shown of two mixing stations as mounted at each side of the car. This permits two men to work simultaneously upon a vehicle, thus further reducing the time necessary to clean a single job.

It is understood of course, that separate connections are made to the pipes 17, 39, 37 and 40 so that each station is supplied with the same cleaning fluids and air under high pressure.

The novelty of the invention lies particularly in the use of the mixing chamber or turbulator 51 in which the cleaning liquids including water and either the grease solvent or soap solution are introduced under pressures in excess of 50 pounds and thoroughly admixed.

From the turbulator the combined fluids pass through the hose connection 52 and the spray is controlled by a control cock 54 in the nozzle 53. This control of the nozzle serves to restrict or expand the area covered by the fluid projected therefrom. As explained, this fluid combination is projected in the form of a vaporous spray or fog, the vapor or fog being formed in the turbulator by the introduction of the air and liquids separately thereto.

It has been found that where the air has been combined directly with the liquid instead of being introduced by means of a separate pipe connection, that the liquid is not as finely dispersed in the vapor as when they are introduced in the manner shown. The maintaining of a considerable volume of vaporous fluid in the chamber 51 serves also to give a more uniform jet of finely dispersed fluid, which when projected against the body of the car has no injurious effect.

It is essential also that the air be introduced directly or in a straight line into the turbulator in order to get the best mixing effect therein.

In addition to the use of this apparatus in connection with motor vehicles, motor trucks and similar conveyances, it may be used in connection with cleaning the rolling stock of railroads such as locomotives, cars and like appliances. When used in this connection, instead of employing water and a grease solvent, and soap solution as explained, the water tanks may be isolated from the system by means of the valves, and a kerosene distillate or like hydrocarbon grease solvents sprayed in the form of a vapor or fog from the nozzle to clean the dirt and grease from the engines or cars.

I claim as my invention:

1. In a vehicle cleaning apparatus, the combination with a vehicle support, of a plurality of independent vessels adjacent said support for containing water, a detergent and a grease solvent, a mixing chamber in communication with certain of the vessels, a compressed air line in communication with said mixing chamber, means for introducing substances to each of said vessels, discharge lines from said vessels, independent valves in each discharge line, a common header in communication with each of said discharge lines, and a turbulator adjacent said header for receiving materials passing therethrough whereby predetermined mixtures of the various substances of the turbulator are thoroughly intermixed and placed in a vaporous form, and a discharge nozzle leading from said turbulator.

2. In a vehicle washing apparatus, the combination with a vehicle support, of a plurality of containers adjacent said support, said containers being adapted to receive individual supplies of water, a detergent and a grease solvent, means for introducing said substances to said containers, a mixing chamber in communication with the detergent and grease solvent containers only, means for admitting air to the mixing chamber, means for admitting air under pressure to each container, an independent discharge line from each container, a manually controlled valve in each line, a common header communicating with all of said lines for receiving different mixtures from said containers, a turbulator in communication with the header through which said mixtures are passed to cause a substantial vaporization thereof, and a nozzle in communication with said turbulator.

3. In a vehicle cleaning apparatus, the combination with a vehicle support, of a plurality of independent vessels adjacent said support for containing water, a detergent and a grease solvent, a mixing chamber in communication with certain of the vessels, a compressed air line in communication with said mixing chamber, means for introducing substances to each of said vessels, discharge lines from said vessels, independent control valves in each discharge line, a turbulator, means for introducing the material from said vessels to the turbulator through which said materials pass thereby predetermined mixtures of the various substances from said vessels are intermixed and placed in a vaporous form, and a discharge nozzle leading from said turbulator.

JACOB P. NICHOLSON.